(12) United States Patent
Grogg et al.

(10) Patent No.: US 10,240,483 B2
(45) Date of Patent: Mar. 26, 2019

(54) BEARING RACE REMOVAL

(71) Applicant: UNITED TECHNOLOGIES CORPORATION, Farmington, CT (US)

(72) Inventors: Gary L. Grogg, South Berwick, ME (US); Garth J. Vdoviak, Readfield, ME (US); Berci Cherpician, Burlington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 375 days.

(21) Appl. No.: 15/031,585

(22) PCT Filed: May 23, 2014

(86) PCT No.: PCT/US2014/039297
§ 371 (c)(1),
(2) Date: Apr. 22, 2016

(87) PCT Pub. No.: WO2015/060900
PCT Pub. Date: Apr. 30, 2015

(65) Prior Publication Data
US 2016/0258323 A1  Sep. 8, 2016

Related U.S. Application Data

(60) Provisional application No. 61/895,806, filed on Oct. 25, 2013.

(51) Int. Cl.
| | |
|---|---|
| *F01D 25/16* | (2006.01) |
| *F16C 27/04* | (2006.01) |
| *F16C 35/04* | (2006.01) |
| *F16C 35/06* | (2006.01) |

(Continued)

(52) U.S. Cl.
CPC ......... *F01D 25/162* (2013.01); *F01D 25/164* (2013.01); *F16C 19/06* (2013.01);
(Continued)

(58) Field of Classification Search
CPC ...... F16C 27/04; F16C 35/045; F16C 35/062; F16C 35/067; F16C 35/077; F16C 43/04
See application file for complete search history.

(56) References Cited

U.S. PATENT DOCUMENTS

| | | |
|---|---|---|
| 3,738,719 A | 6/1973 | Langner |
| 3,901,557 A | 8/1975 | Daniels |

(Continued)

FOREIGN PATENT DOCUMENTS

| | | |
|---|---|---|
| JP | H0585566 U | 11/1993 |
| JP | 08312655 A | 11/1996 |
| JP | 2015194216 A | 11/2015 |

OTHER PUBLICATIONS

Extended European Search Report regarding related EP App. No. 14856310.9; dated Jul. 11, 2017; 6 pgs.

(Continued)

*Primary Examiner* — James Pilkington
(74) *Attorney, Agent, or Firm* — Cantor Colburn LLP

(57) ABSTRACT

A bearing housing may include a main body integrated with a bearing receiving portion. A bearing retention stop may extend from the main body and include a plurality of access cutouts for facilitating the removal of a bearing from the bearing housing without causing damage to the bearing.

15 Claims, 3 Drawing Sheets

(51) Int. Cl.
*F16C 43/04* (2006.01)
*F16C 35/067* (2006.01)
*F16C 35/077* (2006.01)
*F16C 19/06* (2006.01)
*F16C 19/26* (2006.01)

(52) U.S. Cl.
CPC .......... *F16C 27/045* (2013.01); *F16C 35/045* (2013.01); *F16C 35/062* (2013.01); *F16C 35/077* (2013.01); *F16C 43/04* (2013.01); *F05D 2230/70* (2013.01); *F05D 2260/37* (2013.01); *F16C 19/26* (2013.01); *F16C 35/067* (2013.01); *F16C 2226/12* (2013.01); *F16C 2226/50* (2013.01); *F16C 2360/23* (2013.01)

(56) References Cited

U.S. PATENT DOCUMENTS

| | | | |
|---|---|---|---|
| 3,910,651 A | 10/1975 | Pearce et al. | |
| 3,960,418 A | 6/1976 | Bracken | |
| 4,451,110 A | 5/1984 | Forestier et al. | |
| 4,872,767 A * | 10/1989 | Knapp | F16C 27/045 384/535 |
| 5,931,585 A | 8/1999 | Malchow et al. | |
| 8,727,632 B2 * | 5/2014 | Do | F16C 27/04 384/472 |
| 2004/0033851 A1 | 2/2004 | Lubben | |
| 2007/0269157 A1 | 11/2007 | Fahrni et al. | |
| 2010/0027930 A1 | 2/2010 | Kinnaird et al. | |
| 2011/0058759 A1 | 3/2011 | Herborth et al. | |

OTHER PUBLICATIONS

English Abstract for JP08312655—Nov. 26, 1996; 1 pg.
International Search Report for International Application No. PCT/US2014/039297; International Filing Date: May 23, 2014; dated Oct. 27, 2014; 3 pgs.
International Written Opinion for International Application No. PCT/US2014/039297; International Filing Date: May 23, 2014; dated Oct. 27, 2014; 8 pgs.

* cited by examiner

BEARING RACE REMOVAL

TECHNICAL FIELD

The subject matter of the present disclosure relates generally to gas turbine engines and, more particularly, relates to bearings used in gas turbine engines.

BACKGROUND

Gas turbine engines generally include a fan, a compressor and a turbine. A shaft typically transfers power from the turbine to the compressor and the fan. In some gas turbine engines, for example, the turbine may be comprised of a low and high pressure turbine, in which case, a low shaft transfers power from a low pressure turbine to a low pressure compressor and a high shaft transfers power from a high pressure turbine to a high pressure compressor. Each shaft extends longitudinally about the engine central axis and is traditionally supported by at least one bearing located near its upstream end and at least one bearing located near its downstream end. Typically, the at least one bearing located near the upstream end of the shaft is a ball bearing, while the at least one bearing located near the downstream end of the shaft is a roller bearing.

The downstream roller bearing outer race is usually press fit into a bearing housing secured to the engine, so that the friction between the outer race of the bearing and the bearing housing fastens the two parts together. During maintenance and repairs, the bearing outer race may need to be removed from the bearing housing. Often times a dis-assembly tool pushes against a narrow portion of the outer race lead-in-chamfer to remove the bearing outer race from the bearing housing. The sharp edge of the dis-assembly tool can put unwanted markings on the outer race that may result in damage to the outer race and the bearing rollers during subsequent re-assembly of the bearing in the engine. Another removal technique such as heating the bearing housing is not possible because the outer race would expand more than the bearing housing.

Accordingly, there is a need to provide a bearing housing which facilitates the removal of the bearing outer race without causing damage to the bearing or its components.

SUMMARY

In accordance with an aspect of the disclosure, a bearing housing for a gas turbine engine is provided. The bearing housing may include a main body integrated with a bearing receiving portion for receiving a bearing. The bearing retention stop may extend from the main body and include a plurality of access cutouts.

In accordance with another aspect of the disclosure, the bearing retention stop may be annular and may extend inwardly from the main body at a location where the main body is adjacent to the bearing receiving portion.

In accordance with yet another aspect of the disclosure, the bearing retention stop may include a plurality of anti-rotation cutouts.

In accordance with still yet another aspect of the disclosure, the width of each of the plurality of access cutouts may be less than the width of each of the plurality of anti-rotation cutouts.

In further accordance with another aspect of the disclosure, the plurality of access cutouts may be evenly spaced apart from one another between the plurality of anti-rotation cutouts.

In further accordance with yet another aspect of the disclosure, the plurality of access cutouts may be sized to allow sufficient contact area between the bearing retention stop and a flat face of a bearing outer race to keep the stress in the bearing retention stop below yield.

In further accordance with an even further aspect of the disclosure, the main body may include a plurality of slots disposed around its circumference.

In further accordance with still an even further aspect of the disclosure, the main body may include an annular mounting flange.

In accordance with another aspect of the disclosure, a gas turbine engine is provided. The gas turbine engine may include at least a first shaft. At least a first bearing housing may be secured to the gas turbine engine. At least a first bearing may be press fit into the at least first bearing housing and may support the at least first shaft. At least a first bearing retention stop may extend from the at least first bearing housing and may include a plurality of access cutouts.

In accordance with yet another aspect of the disclosure, the at least first bearing retention stop may be annular and may extend inwardly from the at least first bearing housing.

In accordance with still yet another aspect of the disclosure, the at least first bearing retention stop may include a plurality of anti-rotation cutouts.

In further accordance with another aspect of the disclosure, the width of each of the plurality of access cutouts may be less than the width of each of the plurality of anti-rotation cutouts.

In further accordance with yet another aspect of the disclosure, the plurality of access cutouts may be sized to allow sufficient contact area between the at least first bearing retention stop and the at least first bearing to keep the stress in the at least first bearing retention stop below yield.

In further accordance with still yet another aspect of the disclosure, the at least first bearing housing may be formed of a main body integrated with a bearing receiving portion for receiving the at least first bearing. The at least first bearing retention stop may be annular and may extend inwardly from the main body at a location where the main body is adjacent to the bearing receiving portion.

In further accordance with an even further aspect of the disclosure, the main body may include an annular mounting flange for securing the at least first bearing housing to the gas turbine engine.

In accordance with another aspect of the disclosure, a method of constructing a bearing housing for reducing damage to a bearing during removal from the bearing housing is provided. The method entails forming a main body integrated with a bearing receiving portion. Another step may include forming a bearing retention stop extending inwardly from the main body. Yet another step may include forming a plurality of access cutouts disposed on the bearing retention stop.

In accordance with yet another aspect of the disclosure, the method may include sizing the plurality of access cutouts to allow sufficient contact area between the bearing retention stop and a flat face of a bearing outer race for keeping the stress in the bearing retention stop below yield.

In accordance with still yet another aspect of the disclosure, the method may include sizing the width of each of the plurality of access cutouts to be less than a width of each of a plurality of anti-rotation cutouts disposed on the bearing retention stop.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Throughout this specification the terms "downstream" and "upstream" are used with reference to the general direction of gas flow through the engine and the terms "axial", "radial" and "circumferential", and their derivatives, are generally used with respect to the longitudinal central axis of the engine.

Figure 1:
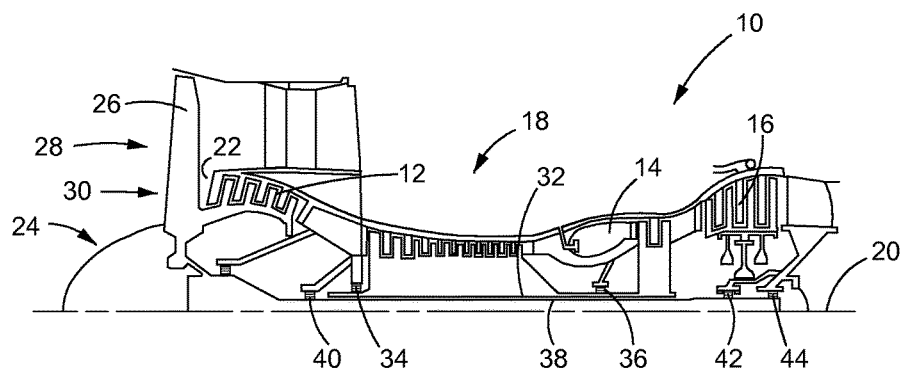
FIG. 1 is a schematic side view of a gas turbine engine with portions sectioned and broken away to show details of the present disclosure.

Referring now to FIG. 1, a gas turbine engine constructed in accordance with the present disclosure is generally referred to by reference numeral 10. The gas turbine engine 10 includes a compressor 12, a combustor 14 and a turbine 16. The serial combination of the compressor 12, the combustor 14 and the turbine 16 is commonly referred to as a core engine 18. The engine 10 lies along a longitudinal central axis 20.

As is well known in the art, air enters compressor 12 at an inlet 22 and is pressurized. The pressurized air then enters the combustor 14. In the combustor 14, the air mixes with jet fuel and is burned, generating hot combustion gases that flow downstream to the turbine 16. The turbine 16 extracts energy from the hot combustion gases to drive the compressor 12 and a fan 24, which includes airfoils 26. As the turbine 16 drives the fan 24, the airfoils 26 rotate so as to take in more ambient air. This process accelerates the ambient air 28 to provide the majority of the useful thrust produced by the engine 10. Generally, in modern gas turbine engines, the fan 24 has a much greater diameter than the core engine 18. Because of this, the ambient air flow 28 through the fan 24 can be 5-10 times higher, or more, than the combustion air flow 30 through the core engine 18. The ratio of flow through the fan 24 relative to flow through the core engine 18 is known as the bypass ratio.

A high shaft 32 extends along the longitudinal central axis 20 and operatively connects the turbine 16 to the compressor 12. A first ball bearing 34 supports the high shaft 32 near its upstream end and a first roller bearing 36 supports the high shaft 32 near its opposite downstream end.

Similarly, a low shaft 38 extends along the longitudinal central axis 20 and also operatively connects the turbine 16 to the compressor 12. A second ball bearing 40 supports the low shaft 38 near its upstream end. A second and third roller bearing 42, 44 supports the low shaft 38 near its downstream end.

Figure 2:
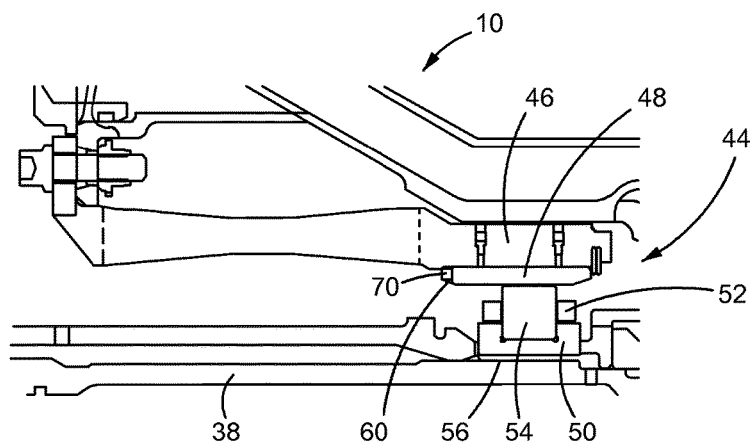
FIG. 2 is a detailed sectional side view of a bearing housing and bearing of FIG. 1, constructed in accordance with the teachings of this disclosure.
Figure 3:
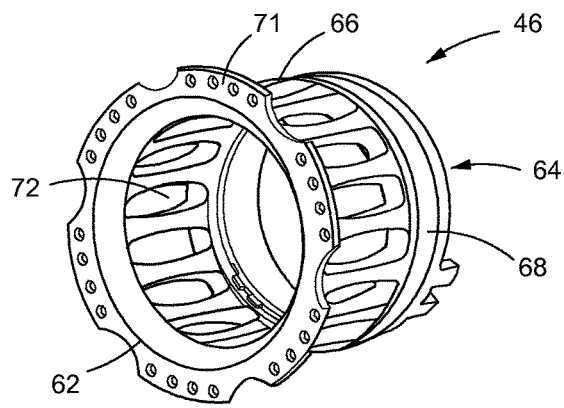
FIG. 3 is a perspective view of a bearing housing, constructed in accordance with the teachings of this disclosure.
Figure 4:
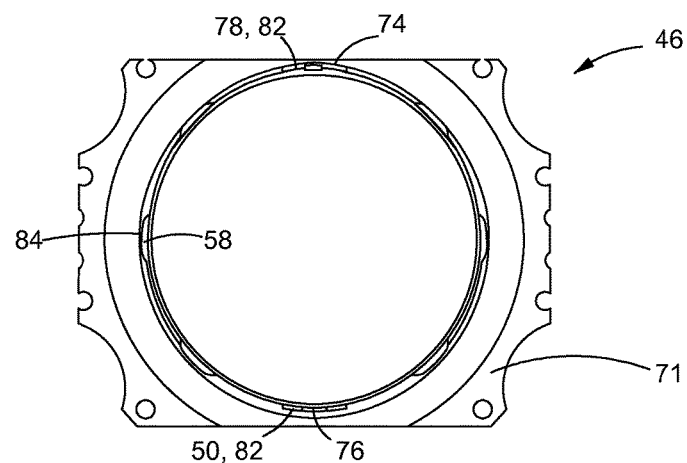
FIG. 4 is a front view of a bearing housing, constructed in accordance with the teachings of this disclosure.
Figure 5:
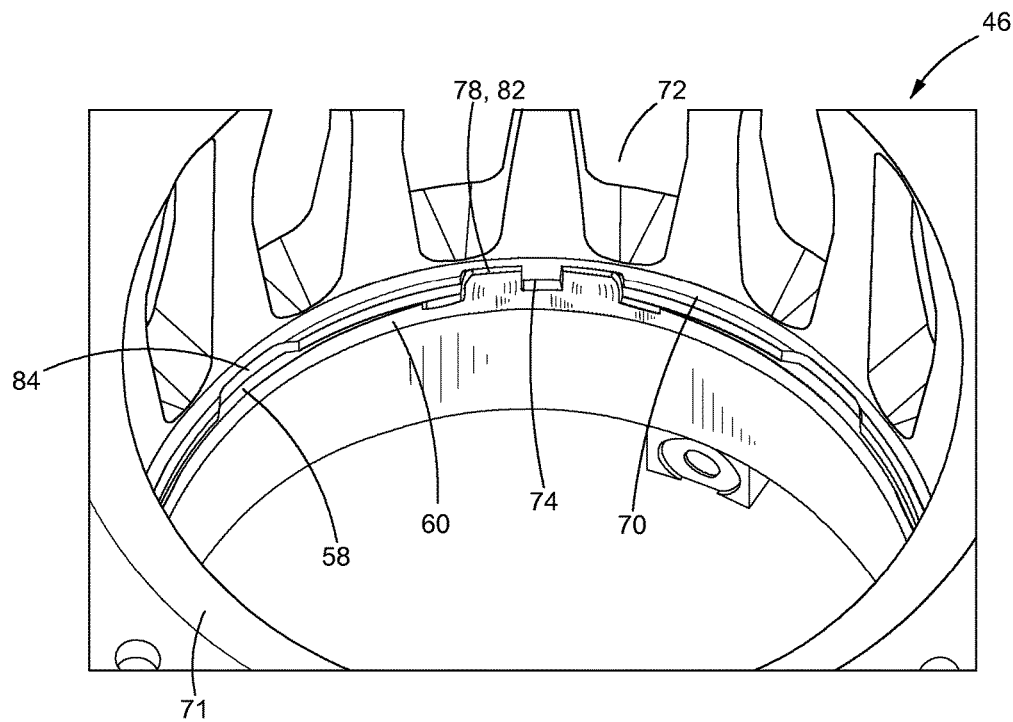
FIG. 5 is a detailed perspective view of a bearing housing, constructed in accordance with the teachings of this disclosure.
Figure 6:
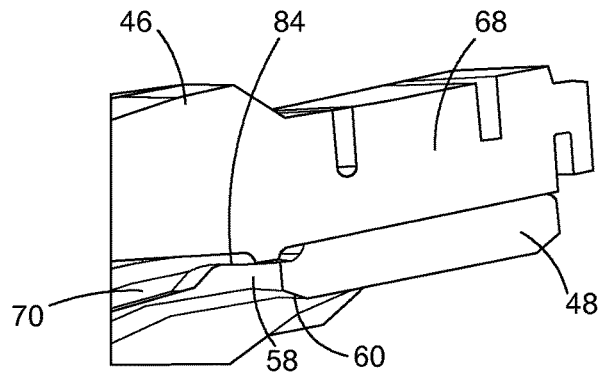
FIG. 6 is perspective view of a detailed portion of a bearing housing, constructed in accordance with the teachings of this disclosure.

Referring to FIG. 2, a bearing housing 46 for receiving the roller bearing 44 is secured to the engine 10. The roller bearing 44 includes a cylindrical outer race 48, a cylindrical inner race 50, a cylindrical cage 52, and rollers 54. The roller bearing outer race 48 may be press fit into the bearing housing 46. The inner race 50 includes an inner bore 56 for receiving the low shaft 38.

With reference to FIGS. 3-6, the bearing housing 46 and the outer race 48 will be described in more detail below. The outer race 48 includes a flat face 58, which is oriented in the upstream direction. The flat face 58 is chamfered to include a lead-in-chamfer portion 60.

The bearing housing 46 is substantially cylindrical with an inlet opening 62 at its upstream end and an outlet opening 64 at its downstream end. Formed between the openings 62, 64 is a main body 66 integrated with a bearing receiving portion 68. A substantially annular bearing retention stop 70 extends inwardly from the main body 66 at its area adjacent to the bearing receiving portion 68. When the roller bearing outer race 48 is press fit into the bearing receiving portion 68 the bearing retention stop 70 contacts the flat face 58 to set the operating position of the outer race 48. The main body 66 may also include an annular mounting flange 71 extending outwardly therefrom and may include a plurality of slots 72 disposed around its circumference. The mounting flange 71 may be used to secure the bearing housing 46 to the engine 10.

Furthermore, the bearing retention stop 70 may include a first anti-rotation cutout 74 disposed opposite a second anti-rotation cutout 76. The first and second anti-rotation cutouts 74, 76 are designed to receive corresponding anti-rotation tabs 78, 80, which extend axially from the flat face 58 of the outer race 48, and prevent the outer race 48 from rotating during operation. Each anti-rotation tab 78, 80 may be formed from a plurality of fingers 82.

Also disposed around the bearing retention stop 70 is a plurality of access cutouts 84. The plurality of access cutouts 84 may be any number of cutouts such as, for a non-limiting example, six cutouts as shown in the FIG. 4. The width of each of the plurality of access cutouts 84 is less than the width of each of the anti-rotation cutouts 74, 76. The width differential is provided to clearly distinguish an access cutout 84 from an anti-rotation cutout 74, 76 to ensure mistakes are prevented during assembly of the bearing 44 into the bearing housing 46. The plurality of access cutouts 84 exposes portions of the flat face 58 while sized to allow sufficient contact area between the bearing retention stop 70 and the flat face 58 to keep the stress in the bearing retention stop 70 below yield. The plurality of access cutouts 84 may be evenly spaced apart from one another between the anti-rotation cutouts 74, 76.

Although only the structure of the bearing housing 46 for roller bearing 44 was described in great detail, it should be understood that the description equally applies to the bearing housings for the first and second roller bearings 36, 42 and, more importantly, to any bearing housing in which a bearing is press fit into the bearing housing. Furthermore, the locations of the bearing housings within the engine 10 are not limited to the exact configurations exemplarily described above, as the details of the bearing housing also fit within the scope of gas turbine engines having more than two shafts.

Figure 7:
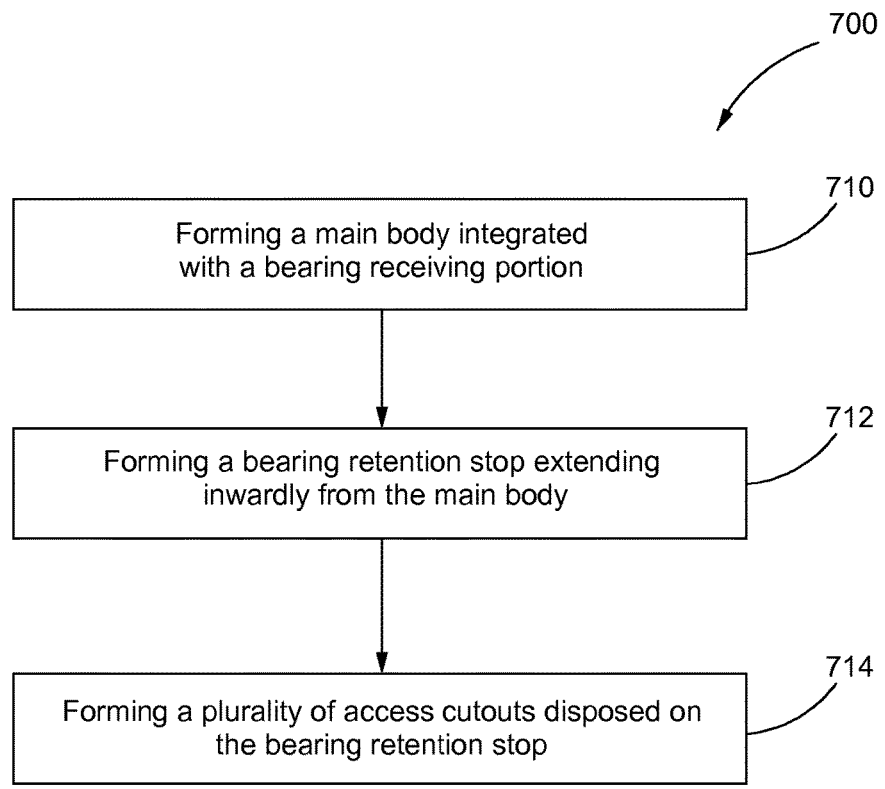
FIG. 7 is a flowchart illustrating a method of the present disclosure.

FIG. 7 illustrates a flowchart 700 of a method of constructing a bearing housing for reducing damage to a bearing during removal from the bearing housing. Box 710 shows the step of forming a main body integrated with a bearing receiving portion. Another step, shown in box 712, is to form a bearing retention stop extending inwardly from the main body. Box 714 illustrates the step of forming a plurality of access cutouts disposed on the bearing retention stop. The plurality of access cutouts may be sized to allow sufficient contact area between the bearing retention stop and a flat face of a bearing outer race for keeping the stress in the bearing retention stop below yield. Additionally, the width of each of the plurality of access cutouts may be sized to be less than a width of each of a plurality of anti-rotation cutouts disposed on the bearing retention stop.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth a bearing housing including a plurality of access cutouts to provide access to the flat face of the outer race of the bearing. The teachings of this disclosure can be employed to manufacture a bearing housing which facilitates the removal of the bearing outer race from the bearing housing without causing damage to the bearing or its components. Moreover, the bearing housing improves maintainability and reliability of the bearing while reducing the weight of the bearing housing.

What is claimed is:

1. A bearing housing for a gas turbine engine, the bearing housing comprising:
   a main body;
   a bearing receiving portion for receiving a bearing, the bearing receiving portion integrated with the main body; and
   a bearing retention stop extending from the main body, the bearing retention stop including a plurality of access cutouts, the bearing retention stop including a plurality of anti-rotation cutouts, the width of each of the plurality of access cutouts is less than the width of each of the plurality of anti-rotation cutouts.

2. The bearing housing of claim 1, wherein the bearing retention stop is annular and extends inwardly from the main body at a location where the main body is adjacent to the bearing receiving portion.

3. The bearing housing of claim 1, wherein the plurality of access cutouts are evenly spaced apart from one another between the plurality of anti-rotation cutouts.

4. The bearing housing of claim 1, wherein the plurality of access cutouts are sized to allow sufficient contact area between the bearing retention stop and a flat face of a bearing outer race to keep the stress in the bearing retention stop below yield.

5. The bearing housing of claim 1, wherein the main body includes a plurality of slots disposed around its circumference.

6. The bearing housing of claim 1, wherein the main body includes an annular mounting flange.

7. A gas turbine engine, comprising:
   at least a first shaft;
   at least a first bearing housing, the at least first bearing housing secured to the gas turbine engine;
   at least a first bearing, the at least first bearing press fit into the at least first bearing housing, the at least first bearing supporting the at least first shaft; and
   at least a first bearing retention stop, the at least first bearing retention stop extending from the at least first bearing housing, the at least first bearing retention stop including a plurality of access cutouts, the at least first bearing stop including a plurality of anti-rotation cutouts, the width of each of the plurality of access cutouts being less than a width of each of the plurality of anti-rotation cutouts.

8. The gas turbine engine of claim 7, wherein the at least first bearing retention stop is annular and extends inwardly from the at least first bearing housing.

9. The gas turbine engine of claim 7, wherein the plurality of access cutouts are sized to allow sufficient contact area between the at least first bearing retention stop and the at least first bearing to keep the stress in the at least first bearing retention stop below yield.

10. The gas turbine engine of claim 7, wherein the at least first bearing housing is formed of a main body integrated with a bearing receiving portion for receiving the at least first bearing, the at least first bearing retention stop is annular and extends inwardly from the main body at a location where the main body is adjacent to the bearing receiving portion.

11. The gas turbine engine of claim 10, wherein the main body includes a plurality of slots disposed around its circumference.

12. The gas turbine engine of claim 10, wherein the main body includes an annular mounting flange for securing the at least first bearing housing to the gas turbine engine.

13. The gas turbine engine of claim 7, wherein the plurality of access cutouts are evenly spaced apart from one another between the plurality of anti-rotation cutouts.

14. A method of constructing a bearing housing for reducing damage to a bearing during removal from the bearing housing, comprising:
   forming a main body integrated with a bearing receiving portion;
   forming a bearing retention stop extending inwardly from the main body;
   forming a plurality of access cutouts disposed on the bearing retention stop; and
   sizing the width of each of the plurality of access cutouts to be less than a width of each of a plurality of anti-rotation cutouts disposed on the bearing retention stop.

15. The method of claim 14, further including sizing the plurality of access cutouts to allow sufficient contact area between the bearing retention stop and a flat face of a bearing outer race for keeping the stress in the bearing retention stop below yield.

\* \* \* \* \*